(12) United States Patent
Chen

(10) Patent No.: US 6,759,833 B1
(45) Date of Patent: Jul. 6, 2004

(54) CHARGER CAPABLE OF SWITCHING POLARITY

(76) Inventor: Kuo-Hua Chen, No. 35, Alley 62, Lane 1, Tung An Road, Ho Mei Town, Chang Hua Hsien (TW)

(*) Notice: Subject to any disclaimer, the term of this patent is extended or adjusted under 35 U.S.C. 154(b) by 0 days.

(21) Appl. No.: 10/429,886

(22) Filed: May 6, 2003

(51) Int. Cl.[7] ............................................. H01M 10/46
(52) U.S. Cl. ...................................... 320/165; 320/105
(58) Field of Search ................................ 320/103, 104, 320/105, 114, 115, 127, 128, 135, 165

(56) References Cited

U.S. PATENT DOCUMENTS 5,541,495 A * 7/1996 Gali ............................ 320/165
6,130,519 A * 10/2000 Whiting et al. ............. 320/105
6,262,492 B1 * 7/2001 Sheng ........................ 307/10.1

* cited by examiner

Primary Examiner—Edward H. Tso
(74) Attorney, Agent, or Firm—Birch, Stewart, Kolasch & Birch, LLP

(57) ABSTRACT

A charger is provided for charging a battery from a source and capable of detecting and switching polarity. The charger includes a first detection block for connection with the source, a second detection block for connection with the source, a first switch connected with the first detection block, a second switch connected with the second detection block and a switch actuation block connected with the switches and for connection with the battery. The switch actuation block includes a first relay and a second relay. The first relay is turned on for sending power from the source to the battery when circuit flows through the first detection block and the first switch. The second relay is turned on for sending power from the source to the battery when circuit flows through the second detection block and the second switch.

14 Claims, 6 Drawing Sheets

US 6,759,833 B1

CHARGER CAPABLE OF SWITCHING POLARITY

FIELD OF THE INVENTION

The present invention relates to a charger capable of switching polarity.

BACKGROUND OF INVENTION

A battery is a very important component for starting up a vehicle. When the battery contains too little power to start up the vehicle, it may be connected with another battery in parallel by means of two wires in order to start up the vehicle. However, attention must be paid to the polarity of the electrodes of the batteries. The positive electrode of the battery must be connected with the positive electrode of the other battery, and the negative electrode with the negative electrode. This causes trouble for a driver who is not at telling the positive electrode from the negative electrode or operates in the dark. If the positive electrode of the battery is connected with the negative electrode of the other battery, there will be sparks or explosion.

Taiwanese Patent Publication 521922 discloses a charger for a battery of a vehicle. This apparatus includes a circuit 55 for detecting a positive electrode and a circuit 56 for detecting a negative electrode. If a positive voltage is detected, a closed circuit is formed. If a negative voltage is detected, a beeper B is actuated in order to warn of wrong connection. Sound produced by means of the beeper B might make the driver tense. When learning of the wrong connection, the driver has to reconnect the charger with the battery.

U.S. Pat. No. 6130519 discloses a portable battery charger including an auto-polarity switch 50. The auto-polarity switch 50 includes a coil assembly 51 and a switching assembly 53. With three solenoids 60, 62 and 64 and two springs 70 and 72, applying the principle of repulsiveness of same polarity and attraction of different polarity, polarity is switched automatically. Malfunction is however quite possible because of residual magnetism and/or fatigue in electricity. Thus, the battery will be damaged.

The present invention is therefore intended to obviate or at least alleviate the problems encountered in prior art.

SUMMARY OF INVENTION

It is the primary objective of the present invention to provide a charger for charging a battery from a source and capable of switching polarity. According to the present invention, a charger includes a first detection block for connection with a source of energy, a second detection block for connection with the source, a first switch connected with the first detection block, a second switch connected with the second detection block and a switch actuation block connected with the switches and for connection with a battery. The switch actuation block includes a first relay and a second relay. The first relay is turned on for sending power from the source to the battery when circuit flows through the first detection block and the first switch. The second relay is turned on for sending power from the source to the battery when circuit flows through the second detection block and the second switch.

Other objects, advantages, and novel features of the invention will become more apparent from the following detailed description when taken in conjunction with the attached drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
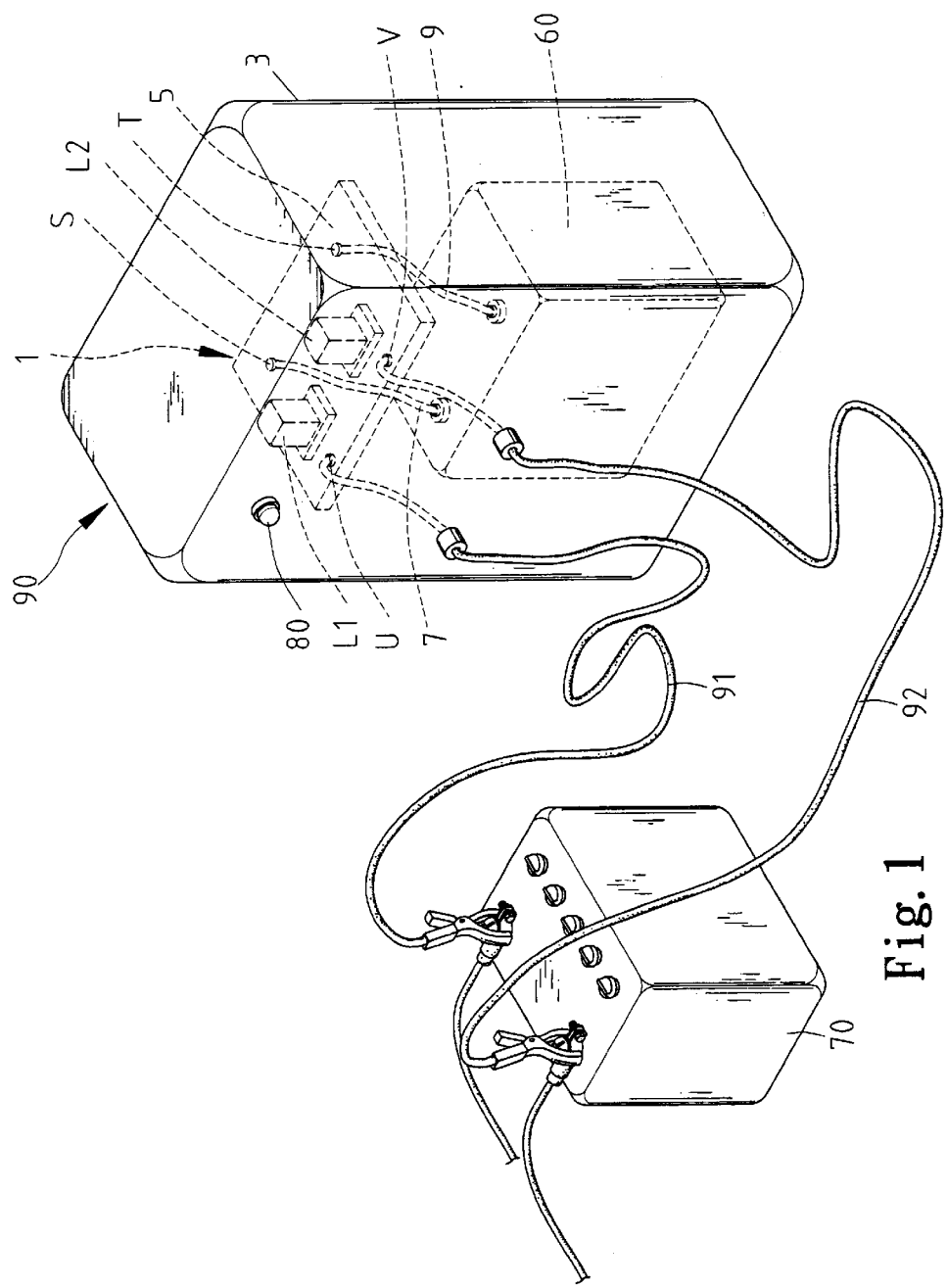
FIG. 1 is a perspective view of a battery charged by means of a charger according to the preferred embodiment of the present invention.

Referring to FIG. 1, according to the preferred embodiment of the present invention, a charger 1 is provided for sending power from an abundant battery 60 to a deficient battery 70. The charger 1 is capable of switching polarity.

The charger 1 includes a case 3, a circuit board 5, two wires 7 and 9, a light 80 and two wires 91 and 92. The abundant battery 60 is installed in the case 3. The circuit board 5 is installed in the case 3. The wire 7 leads from an electrode of the abundant battery 60 to a contact S of the circuit board 5. The wire 9 leads from the other electrode of the abundant battery 60 to a contact T of the circuit board 5. The light 80 is mounted on the case 3 and connected with the circuit board 5. The wire 91 leads from a contact U of the circuit board 5 to an electrode of the deficient battery 70 through an aperture defined in the case 3. The wire 92 leads from a contact V of the circuit board 5 to the other electrode of the deficient battery 70 through an aperture defined in the case 3.

Figure 2:
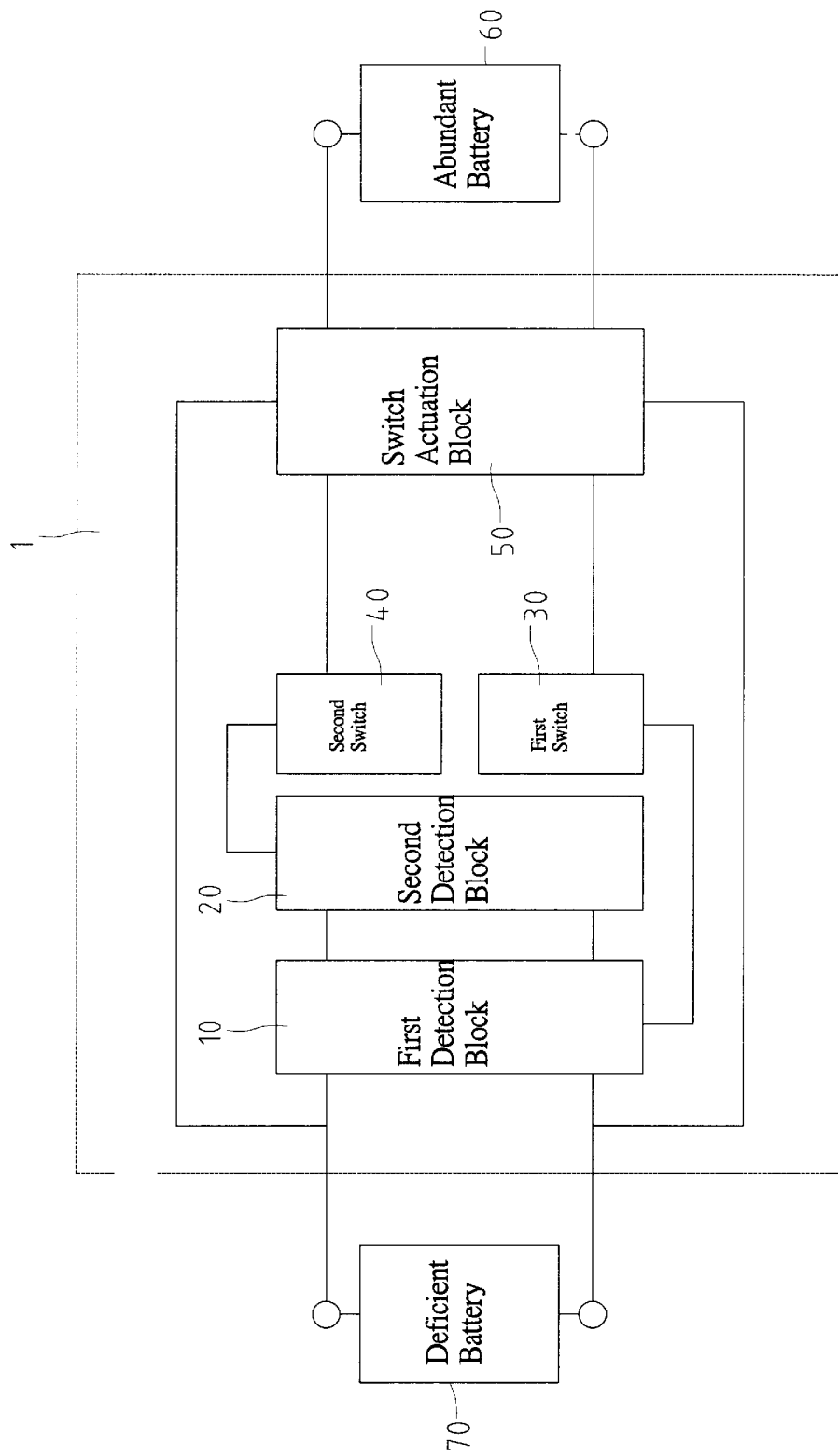
FIG. 2 is a block diagram of the charger of FIG. 1.

Referring to FIG. 2, the circuit board 5 embodies a circuit including a first detection block 10 for connection with the abundant battery 60, a second detection block 20 for connection with the abundant battery 60, a first switch 30 connected with the first detection block 10, a second switch 40 connected with the second detection block 20 and a switch actuation block 50 connected with both of the first switch 30 and the second switch 40.

Figure 3:
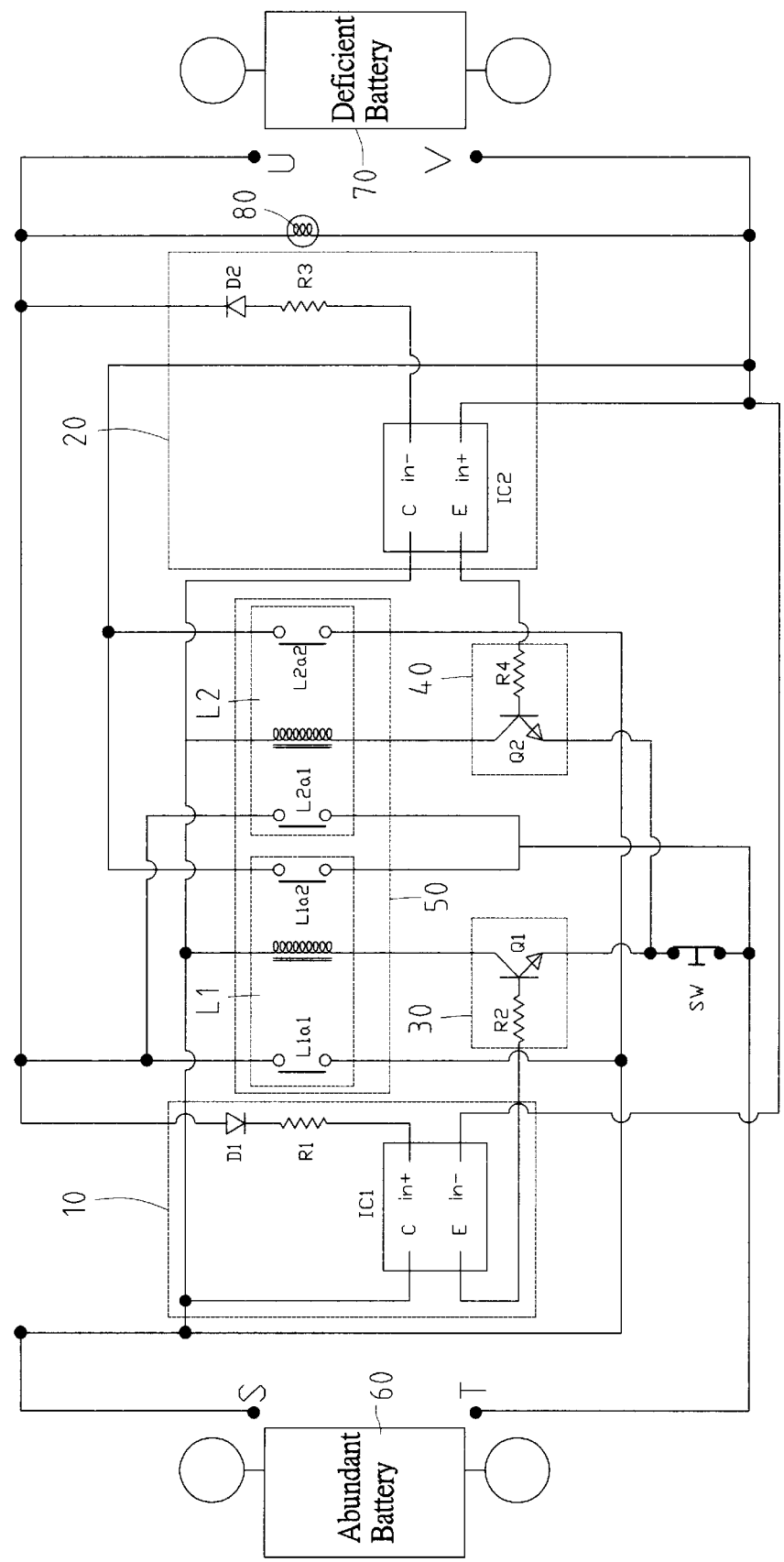
FIG. 3 is a circuit diagram of the charger of FIG. 2.

Referring to FIG. 3, the first detection block 10 includes an optical couple controller implemented as an integrated circuit IC1, a diode D1 and a resistor R1. The integrated circuit IC1 includes terminals C, E, IN+ and IN−. The terminal C is connected with the contact S. The terminal E is connected with the first switch 30. The terminal IN+ is connected with the diode D1 and the resistor R1 in series. Furthermore, the diode D1 is connected with the contact U. The terminal IN− is connected with the contact V.

The second detection block 20 includes an optical couple controller implemented as an integrated circuit IC2, a diode D2 and a resistor R3. The integrated circuit IC2 includes terminals C, E, IN+ and IN−. The terminal C of the second integrated circuit IC2 is connected with the contact S and the switch actuation block 50. The terminal E of the integrated circuit IC2 is connected with the second switch 40. The terminal IN− of the integrated circuit IC2 is connected with the diode D2 and the resistor R3 in series. The terminal IN− of the integrated circuit IC2 is connected with the terminal IN1 of the integrated circuit IC1. The diode D2 is connected with the contact U. The terminal IN+ is connected with the contact V.

The first switch 30 includes a transistor Q1 and a resistor R2. The resistor R2 is connected between the terminal E of the integrated circuit IC1 and the base of the transistor Q1. The collector of the transistor Q1 is connected with the switch actuation block 50. The second switch 40 includes a transistor Q2 and a resistor R4. The resistor R4 is connected between the terminal E of the integrated circuit IC2 and the base of the transistor Q2. The collector of the transistor Q2 is connected with the switch actuation block 50.

The emitter of the transistor Q1 and the emitter of the transistor Q2 are both connected with a reset switch SW.

The switch actuation block 50 includes a first relay L1 and a second relay L2. The first relay L1 includes a first contact switch L1A1 and a second contact switch L1A2. Two ends of the first contact switch L1A1 are connected with the contacts U and S, respectively. Two ends of the second contact switch L1A2 are connected with the contacts V and T respectively. The second relay L2 includes a first contact switch L2A1 and a second contact switch L2A2. Two ends of the first contact switch L1A1 of the second relay L2 are connected with the contacts U and T, respectively. Two ends of the second contact switch L1A2 of the second relay L2 are connected with the contacts V and S, respectively.

The light 80 includes an electrode connected with the contact U and another electrode connected with the contact V.

Figure 4:
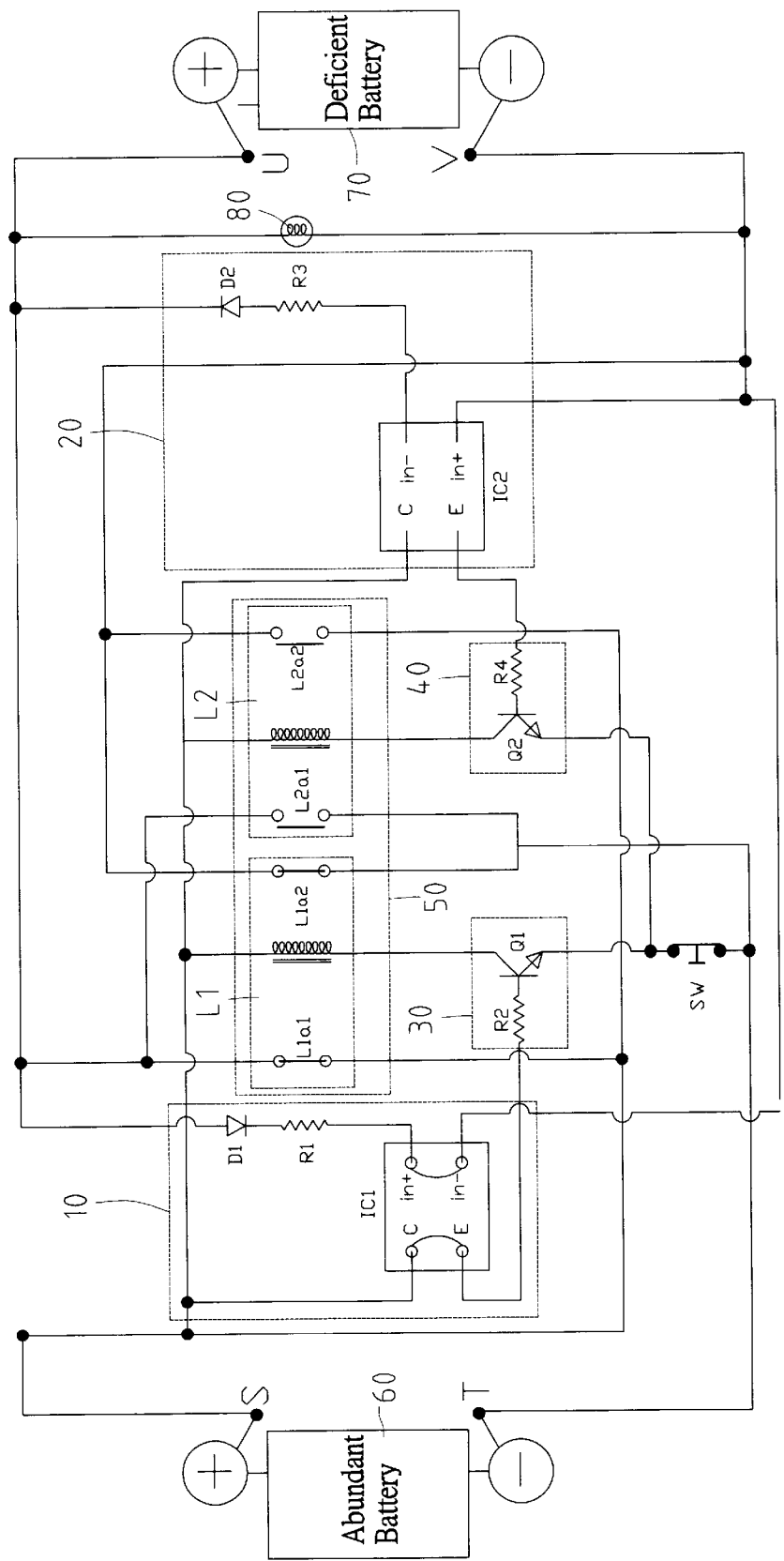
FIGS. 4 and 5 show the charger of FIG. 3 in operation.

Referring to FIG. 4, the contact S is connected with the positive electrode of the abundant battery 60, the contact T with the negative electrode of the abundant battery 60. The contact U is connected with the positive electrode of the deficient battery 70, the contact V with the negative electrode of the deficient battery 70. Current flows from the positive electrode of the deficient battery 70 to the optical couple controller IC1 through the diode D1 and the resister R1, thus coupling the terminal IN+ with the terminal IN−, thus forming a circuit. The terminals C and E are connected so that the positive electrode of the abundant battery 60, the optical couple controller IC1, the resister R2, the resister Q1 and the reset witch SW form a circuit. Thus, the collector of the transistor Q1 is connected with the emitter of the transistor Q1. The first relay L1 is turned on so as to close its contact switches L1A1 and L1A2. The positive electrode of the abundant battery 60 is connected with the positive electrode of the deficient battery 70 because of the closing of the first contact switch L1A1 of the first relay L1. The negative electrode of the abundant battery 60 is connected with the negative electrode of the deficient battery 70 because of the closing of the second contact switch L1A2 of the first relay L1. Thus, the abundant battery 60 is connected in parallel with the deficient battery 70.

Figure 5:
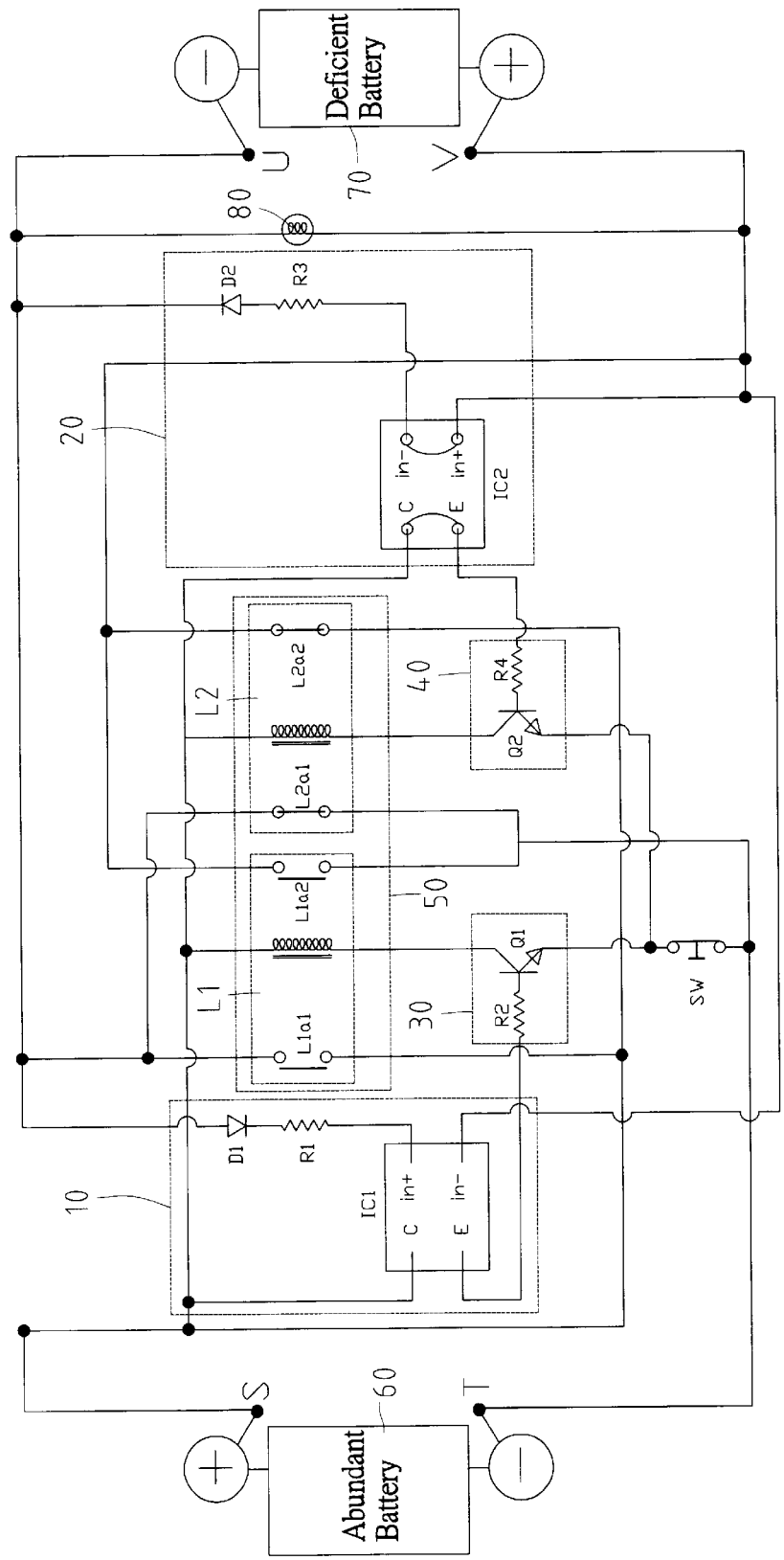

Referring to Figure 5, the contact S is connected with the positive electrode of the abundant battery 60, the contact T with the negative electrode of the abundant battery 60. The contact U is connected with the negative electrode of the deficient battery 70, the contact V with the positive electrode of the deficient battery 70. Current flows from the positive electrode of the deficient battery 70 to the optical couple controller IC2 through the diode D2 and the resister R3, thus coupling the terminal C with the terminal E. The positive electrode of the abundant battery 60, the optical couple controller IC2, the resister R4, the transistor Q2 and the reset switch SW form a circuit. Thus, the collector of the transistor Q2 is connected with the emitter of the transistor Q2. The second relay L2 is turned on so as to close its contact switches L2A1 and L2A2. The positive electrode of the abundant battery 60 is connected with the positive electrode of the deficient battery 70 because of the closing of the second contact switch L2A2 of the second relay L2. The negative electrode of the abundant battery 60 is connected with the negative electrode of the deficient battery 70 because of the closing of the first contact switch L2A1 of the second relay L2. Thus, the abundant battery 60 is connected in parallel with the deficient battery 70.

Figure 6:
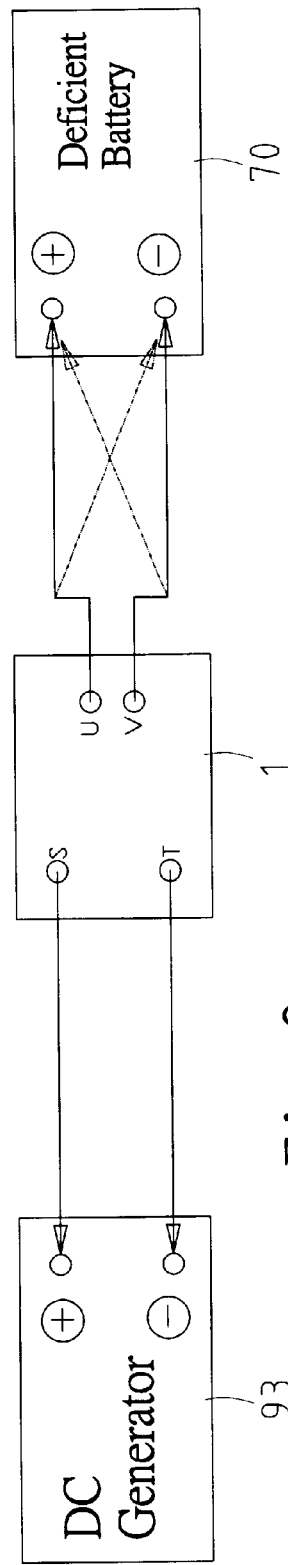
FIG. 6 shows the charger including a generator.

The abundant battery 60 of FIGS. 1~5 may be replaced with a DC generator 93 shown in FIG. 6.

Figure 7:
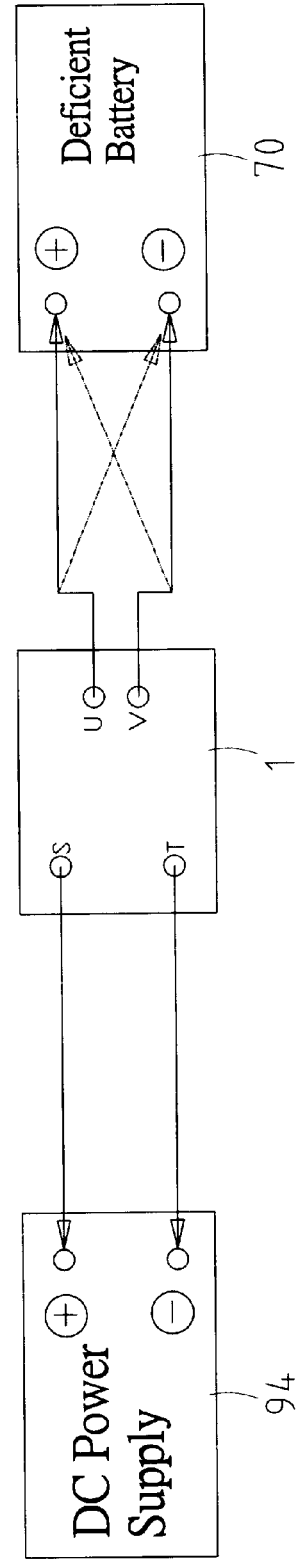
FIG. 7 shows the charger including a DC power supply.

The abundant battery 60 of FIGS. 1~5 may be replaced with a DC power supply 94 shown in FIG. 7. The DC power supply 94 is connected with a main power system (not shown).

The present invention has been described through detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. A charger for charging a battery from a source and capable of switching polarity, the charger including:
    a first detection block for connection with the source;
    a second detection block for connection with the source;
    a first switch connected with the first detection block;
    a second switch connected with the second detection block; and
    a switch actuation block connected with the switches and for connection with the battery, wherein the switch actuation block includes a first relay and a second relay, and the first relay is turned on for sending power from the source to the battery when circuit flows through the first detection block and the first switch, and the second relay is turned on for sending power from the source to the battery when circuit flows through the second detection block and the second switch.

2. The charger according to claim 1 wherein the first detection block includes:
    an optical couple controller including:
        a first terminal (C) connected with the source and the first relay;
        a second terminal (E) connected with the first switch;
        a third terminal (IN+) connected with an electrode of the battery; and
        a fourth terminal (IN−) connected with the second detection block;
    a resistor connected with the third terminal (IN+); and
    a diode connected with the resistor and the other electrode of the battery.

3. The charger according to claim 2 wherein the first switch includes:
    a transistor including a base, a collector connected with the first relay and an emitter connected with the second switch; and
    a resistor connected between the first detection block and the base of the transistor so that the first relay is turned on when current flows through the transistor.

4. The charger according to claim 3 including a reset switch connected with the emitter of the transistor, the relays and the battery.

5. The charger according to claim 3 wherein the first relay includes:
    a first contact switch connected with an electrode of the source and an electrode of the battery; and
    a second contact switch connected with the other electrode of the source and the other electrode of the battery so that the contact switches can be closed because of magnetism.

6. The charger according to claim 1 wherein the second detection block includes:
   an optical couple controller including:
      a first terminal (C) connected with the source and the second relay;
      a second terminal (E) connected with the second switch;
      a third terminal (IN+) connected with an electrode of the battery; and
      a fourth terminal (IN−) connected with the first detection block;
   a resistor connected with the third terminal (IN+); and
   a diode connected with the resistor and the other electrode of the battery.

7. The charger according to claim 6 wherein the second switch includes:
   a transistor including a base, a collector connected with the second relay and an emitter connected with the first switch; and
   a resistor connected between the second detection block and the base of the transistor so that the second relay is turned on when current flows through the transistor.

8. The charger according to claim 7 wherein the second relay includes:
   a first contact switch connected with an electrode of the source and an electrode of the battery; and
   a second contact switch connected with the other electrode of the source and the other electrode of the battery so that the contact switches can be closed because of magnetism.

9. The charger according to claim 8 including a reset switch connected with the emitter of the transistor, the relays and the battery.

10. The charger according to claim 1 including a warning device connected in parallel with the battery.

11. The charger according to claim 10 wherein the warning device is a light.

12. The charger according to claim 1 wherein the source is a battery.

13. The charger according to claim 1 wherein the source is a DC generator.

14. The charger according to claim 1 wherein the source is a DC power supply connected with a main power system.

* * * * *